April 18, 1967    M. J. WRIGHT ET AL    3,315,141
BATTERY CHARGING SYSTEMS
Filed May 14, 1964    2 Sheets-Sheet 1

April 18, 1967   M. J. WRIGHT ETAL   3,315,141
BATTERY CHARGING SYSTEMS

Filed May 14, 1964  2 Sheets-Sheet 2

United States Patent Office 3,315,141
Patented Apr. 18, 1967

3,315,141
BATTERY CHARGING SYSTEMS
Maurice James Wright and Lancelot Phoenix, Birmingham, England, assignors to Joseph Lucas (Industries) Limited, Birmingham, England
Filed May 14, 1964, Ser. No. 367,331
5 Claims. (Cl. 320—59)

This invention relates to battery charging systems of the kind including a single or multi-phase permanent magnet alternator supplying power through a full-wave rectifier to a battery.

The object of the invention is to provide in such a system convenient means for regulating the voltage applied to the battery.

According to the invention, a system of the kind specified includes one or more controlled rectifiers forming part of said rectifier and through the anode-cathode paths of which current flows from the phase or phases of the alternator respectively to the battery, a power supply derived from the battery and connected to the gate or gates of the controlled recifier or rectifiers to permit the controlled rectifier or rectifiers to conduct, and means operable when the battery voltage exceeds a predetermined value for preventing the controlled rectifier or rectifiers from being rendered conductive.

In the accompanying drawings, FIGURES 1 to 4 respectively illustrate four examples of the invention as applied to a three-phase delta-connected permanent magnet alternator.

Figure 1:
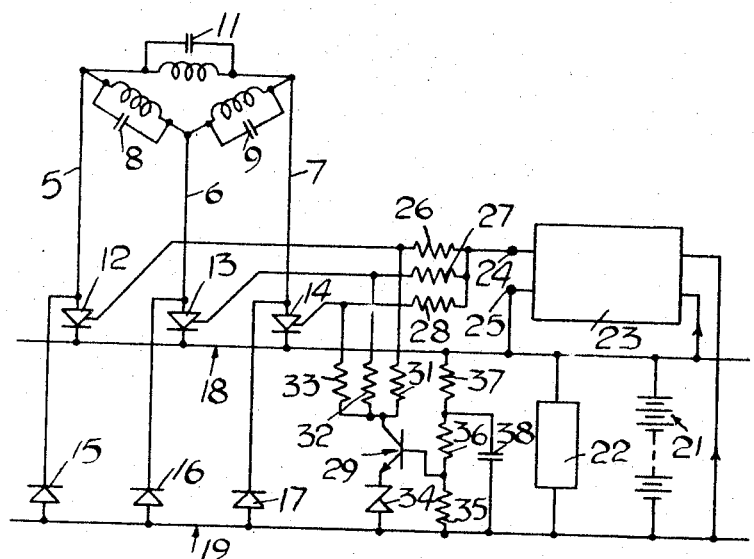

Referring to FIGURE 1, the three-phase lines 5, 6, 7 of the alternator are interconnected through capacitors 8, 9, 11 respectively, whilst the three-phase lines of the alternator are connected respectively to the anodes of controlled rectifiers 12, 13, 14 and to the cathodes of diodes 15, 16, 17. The system further includes first and second D.C. lines 18, 19 between which the battery 21 and any further load 22 to be fed by the alternator are connected in parallel, the line 18 being connected to the cathodes of the controlled rectifiers 12, 13, 14 and the line 19 being connected to the anodes of the diodes 15, 16, 17.

Any convenient means 23 operated by the battery is provided for producing a subsidiary power supply which is applied to terminals 24, 25 so that the terminals 24, 25 are positive and negative in use respectively. The terminal 25 is connected to the line 18, whilst the terminal 24 is connected to the gates of the three controlled rectifiers 12, 13, 14 through resistors 26, 27, 28 respectively. Moreover, the gates of the controlled rectifiers are connected to the collector of an n–p–n transistor 29 through resistors 31, 32, 33 respectively. The emitter of the transistor 29 is connected to the line 19 through the cathode and anode of a Zener diode 34 whilst its base is connected to the line 19 through a resistor 35 and to the line 18 through resistors 36, 37 in series. The resistors 35, 36 are bridged by a capacitor 38.

In operation, when the voltage between the lines 18, 19 (i.e. the battery voltage) is below a predetermined value, the Zener diode 34 is non-conductive and so no base current flows in the transistor 29, which is therefore off. The subsidiary voltage supply 23 maintains the gates of the controlled rectifiers at such a positive potential with respect to their cathodes that they conduct whenever their anode-cathode voltages become positive, the controlled rectifiers being switched off whenever a reverse-voltage is applied to their anode-cathode circuits. Thus, under these circumstances, the controlled rectifiers act in effect as diodes. However, when the voltage between the lines 18, 19 exceeds the predetermined value, the voltage across the resistor 35 exceeds the breakdown voltage of the Zener diode 34 which conducts so that base current is supplied to the transistor. The resultant conduction of the transistor 29 causes a negative bias to be applied to the gates of the controlled rectifiers, so that when they are rendered non-conductive by the reverse voltage across them they are not switched on again. Under these conditions, the output from the alternator is not applied to the lines 18, 19. The capacitor 38 now discharges through resistors 36, 35 and maintains the transistor 29 conductive for a short while. However, eventually the voltage across the Zener diode 34 falls below its breakdown value and the transistor is switched off, so that the positive bias is restored to the gates and the capacitor 38 again charges. Thus, when the voltage between lines 18, 19 is above the predetermined value, the transistor 29 will be switched on and off rapidly at a rate determined by the capacitor 38, so that the controlled rectifiers will in turn be switched on and off, the on/off ratio determining the mean voltage developed across the lines 18, 19.

Figure 2:
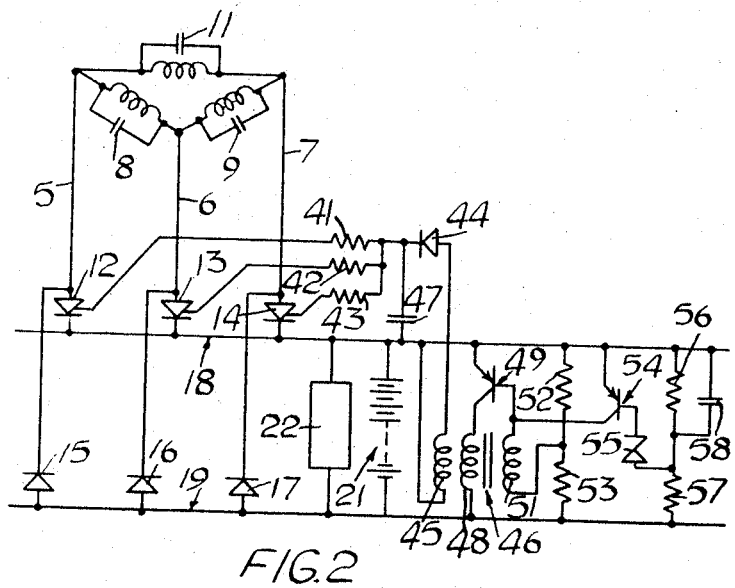

In the example shown in FIGURE 2, the connections from the alternator to the lines 18, 19 are made as in the first example, but the subsidiary supply terminals and the remaining components are different. In this example, the gates of the controlled rectifiers are connected through resistors 41, 42, 43 respectively to the cathode of a diode 44, the anode of which is connected to the line 18 through a first winding 45 on a transformer 46. The cathode of the diode 44 is further connected via a capacitor 47 to the line 18.

The transformer 46 includes a second winding 48 having one end connected to the line 19 and its other end connected to the collector of a p–n–p transistor 49, and a third winding 51 having one end connected to the base of the transistor 49 and its other end connected to the lines 18, 19 respectively through resistors 52, 53. The base of the transistor 49 is further connected to the collector of a second p–n–p transistor 54, the base of which is connected to the cathode of a Zener diode 55. The anode of the Zener diode is connected to the lines 18, 19 respectively through resistors 56, 57 the resistor 56 being bridged by a capacitor 58. The emitters of the transistor 49, 54 are connected to the line 18.

The arrangement is such that as long as the voltage between the lines 18, 19 is below a predetermined value, Zener diode 55 is non-conductive so that the transistor 54 is off, and the transistor 49 and its associated windings form an oscillator, the A.C. output of which is rectified by the diode 44, smoothed by the capacitor 47 and applied to the gates of the controlled rectifiers so that they act as diodes as in the first example. However, when the predetermined value is exceeded, the Zener diode breaks down and the transistor 54 receives base current, so conducting and switching off the transistor 49. The controlled rectifiers are not now switched on again when they are reverse biased, and the voltage between lines 18, 19 falls. The capacitor 58 discharges through resistor 56 to hold Zener diode 55 on, but after a short while the Zener diode cuts off and the oscillator operates again so that the controlled rectifiers conduct and the capacitor 58 recharges. Thus, the controlled rectifiers are switched on and off at a frequency determined by capacitors 47, 58.

Figure 3:
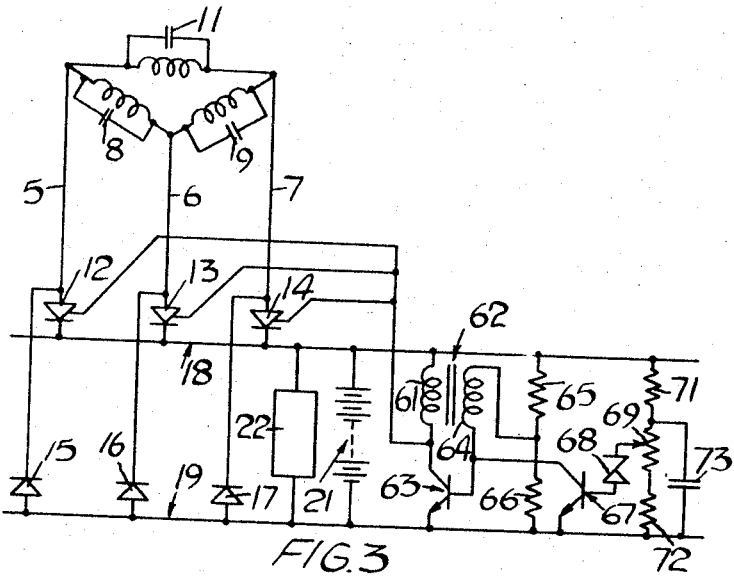

FIGURE 3 illustrates a simplification of FIGURE 2 in which the gates of the controlled rectifiers are connected to the line 18 through a winding 61 of a transformer 62, and to the line 19 through the collector and emitter of an n-p-n transistor 63. The transformer has a second winding 64 connected between the base of the transistor 63 and a point intermediate a pair of resistors 65, 66 bridging the lines 18, 19. A second n-p-n transistor 67 has its emitter connected to the line 19, its collector connected to the base of the transistor 63 and its base connected through a Zener diode 68 to a variable point on a resistor 69 connected to lines 18, 19 through resistors 71, 72 respectively, the resistors 69, 72 being bridged by a capacitor 73.

Although a different form of oscillator is used, the operation of the circuit shown in FIGURE 3 is identical to that shown in FIGURE 2. The use of n-p-n transistors allows the windings 61 to take the place of the two windings 45, 48 in FIGURE 2, and in some cases matching can be improved by connecting the gates to a point on the winding 61. Moreover, in FIGURE 3 the oscillator frequency is sufficiently high to allow capacitor 47 to be omitted, and the gate-cathode characteristics of the controlled rectifier are such that they act as their own diodes instead of the diode 44, and also permit resistors 41, 42, 43 to be omitted.

Figure 4:
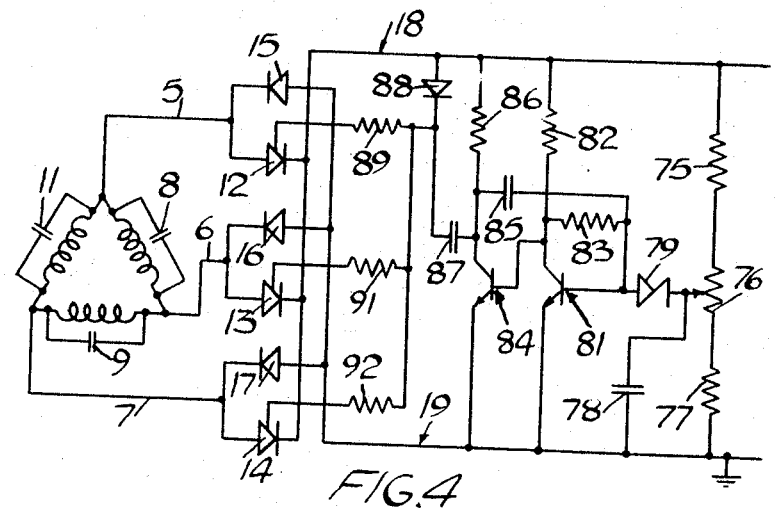

Referring now to the example shown in FIGURE 4, connected between the lines 18, 19 are resistors 75, 76, 77 in series, a variable point on the resistor 76 being connected to the line 19 through a capacitor 78 and, through a Zener diode 79, to the base of an n-p-n transistor 81. The transistor 81 has its emitter connected to the line 19 and its collector connected to the line 18 through a resistor 82.

The collector and base of the transistor 81 are interconnected through a resistor 83, and moreover the collector is connected to the base of a second n-p-n transistor 84 the emitter of which is connected to the line 19. The collector of the transistor 84 is connected to the base of the transistor 81 through a capacitor 85 and is further connected to the line 18 through parallel paths one of which contains a resistor 86 and the other of which contains a capacitor 87 in series with the cathode and anode of a diode 88. A point intermediate the capacitor 87 and diode 88 is connected through resistors 89, 91, 92 respectively to the gates of the controlled rectifiers 12, 13, 14.

In operation, provided the voltage between the lines 18, 19 is below a predetermined value, the Zener diode 79 is non-conductive. However, base current flows to the transistor 81 through resistors 82, 83 and by virtue of the resistor 83 and the capacitor 85, which provides feedback from the transistor 84 to the transistor 81, the circuit oscillates in known manner.

When the transistor 84 conducts, the capacitor 87 charges though the transistor 84 and diode 88 so that its plate connected to the collector of the transistor 84 is at the potential of the negative line 19. However, when the transistor 84 becomes non-conductive, this plate assumes the positive potential, and so the other plate becomes more positive than the positive line 18. The capacitor 87 now discharges through the gate-cathode circuits of the controlled rectifiers. This happens once for each oscillation of the regulating circuit.

The full wave rectifier acts in the normal manner provided the controlled rectifiers conduct, it being understood that the controlled rectifiers will be reverse biased once in each cycle of the alternator and so will become non-conductive. However, the frequency of operation of the oscillating circuit is considerably in excess of the frequency of the alternator. Hence, a number of pulses are applied to each controlled rectifier during each cycle of the alternator, and as a result when a controlled rectifier is forward biased a pulse is applied to its gate substantially immediately. Thus, when the voltage between the first and second terminals is below the predetermined value the controlled rectifiers act as if they were diodes.

When the predetermined voltage between the lines 18, 19 is exceeded, the Zener diode 79 breaks down, and additional base current is supplied to the transistor 81 so that this transistor is fully conductive. The regulating circuit does not now oscillate, and so no pulses are applied to the controlled rectifiers, so that no rectifier current flows to the battery. The voltage between the lines 18, 19 now falls again until the Zener diode becomes non-conductive, at which point the regulating circuit oscillates again. The capacitor 78 ensures that the initial surge of current to the lines 18, 19 when the oscillating circuit oscillates does not break down the Zener diode again unless the mean voltage is above the predetermined value. The voltage at which regulation occurs can be varied by moving the variable point on the second resistor.

In all the circuits described, since the gating current for the controller rectifiers is obtained from the battery rather than from the alternator, this current will not be dependent on the speed of the alternator. Moreover, there will be no output current from the alternator if it is rotated after the battery is disconnected, and so no danger of damaging the load by the effect of the alternator output without the smoothing effect of the battery.

Having thus described my invention what I claim as new and desire to secure by Letters Patent is:

1. Battery charging apparatus of the kind including a permanent magnet alternator supplying power through a full-wave rectifier to a battery, including at least one controlled rectifier forming part of said rectifier and through the anode-cathode path of which current flows to the battery, comprising a power supply derived from the battery and connected to the gate of the controlled rectifier to permit the controlled rectifier to conduct, and means operable when the battery voltage exceeds a predetermined value for preventing the controlled rectifier from being rendered conductive.

2. A system as claimed in claim 1 in which the power supply maintains the gate of the controlled rectifier at positive potential relative to its cathode, and said means applies a negative voltage to the gate when such predetermined value is exceeded.

3. A system as claimed in claim 2 including a Zener diode which breaks down when the predetermined value is exceeded, and a transistor which is rendered conductive when the Zener diode breaks down to apply said negative voltage.

4. A system as claimed in claim 1 in which the power supply is an oscillator supplying positive pulses to the gate, and said means prevents oscillation of the oscillator when said predetermined value is exceeded.

5. A system as claimed in claim 4 including a Zener diode which breaks down when said predetermined value is exceeded and prevents oscillation of the oscillator.

References Cited by the Examiner

UNITED STATES PATENTS

| | | | |
|---|---|---|---|
| 3,018,432 | 1/1962 | Palmer | 323—66 |
| 3,134,068 | 5/1964 | Feltman | 323—22 |
| 3,160,805 | 12/1964 | Lawson | 320—39 |
| 3,230,443 | 1/1966 | Hallidy | 320—28 |
| 3,281,638 | 10/1966 | Crawford | 320—40 |

JOHN F. COUCH, *Primary Examiner.*

S. WEINBERG, *Assistant Examiner.*